(12) United States Patent
Schultz

(10) Patent No.: US 8,355,485 B2
(45) Date of Patent: Jan. 15, 2013

(54) SYSTEM AND METHOD FOR REPORTING TELECOMMUNICATIONS UTILIZATION AND FORECASTING

(75) Inventor: Justin F. Schultz, Mansfield, OH (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1667 days.

(21) Appl. No.: 11/507,142

(22) Filed: Aug. 21, 2006

(65) Prior Publication Data

US 2008/0065570 A1   Mar. 13, 2008

(51) Int. Cl.
*H04M 15/00* (2006.01)
(52) U.S. Cl. .............................. 379/112.06; 379/112.07
(58) Field of Classification Search ............ 379/112.06, 379/112.07, 201.02, 201.03, 201.12, 219, 379/221.06, 221.13
See application file for complete search history.

(56) References Cited

U.S. PATENT DOCUMENTS

| | | | |
|---|---|---|---|
| 5,724,658 A | 3/1998 | Hasan | |
| 6,999,576 B2 | 2/2006 | Sacra | |
| 7,106,844 B1 * | 9/2006 | Holland | 379/201.01 |
| 8,023,628 B2 | 9/2011 | Schultz | |
| 8,045,692 B2 | 10/2011 | Schultz | |
| 2002/0136391 A1 * | 9/2002 | Armstrong | 379/242 |
| 2003/0149629 A1 | 8/2003 | Claridge et al. | |
| 2004/0024765 A1 | 2/2004 | Bauer et al. | |
| 2004/0096048 A1 | 5/2004 | Sacra | |
| 2004/0190708 A1 | 9/2004 | Cuckson et al. | |
| 2004/0193509 A1 | 9/2004 | Cuckson et al. | |
| 2004/0193645 A1 | 9/2004 | Cuckson et al. | |
| 2004/0193646 A1 * | 9/2004 | Cuckson et al. | 707/104.1 |
| 2008/0043948 A1 | 2/2008 | Schultz | |
| 2008/0046477 A1 | 2/2008 | Schultz | |
| 2008/0065570 A1 | 3/2008 | Schultz | |
| 2008/0130523 A1 | 6/2008 | Fridman et al. | |
| 2012/0076292 A1 | 3/2012 | Schultz et al. | |

OTHER PUBLICATIONS http://www.leginfo.ca.gov/pub/05-06/bill/asm/ab_1351-1400/ab_1380_bill_20050502_amended_asm.pdf, Gordon et al, May 2005.

* cited by examiner

*Primary Examiner* — Quoc D Tran
(74) *Attorney, Agent, or Firm* — Patton Boggs LLP

(57) ABSTRACT

A system and method for forecasting and reporting telecommunications usage by a telecommunications carrier. The method includes storing data indicative of telephone number usage of telephone numbers assigned to the telecommunications carrier in a first database. The first database may be queried to obtain a first set of data including telephone number information associated with the telecommunications carrier. A second database operating on a network may be queried to obtain a second set of data including telephone number information associated with the telecommunications carrier. Telephone number usage and forecast data may be generated from the first and second sets of data.

20 Claims, 12 Drawing Sheets

FROM FIG. 3A-1

| NPA-NXX | X | Rate Center Abbreviation | Numbering Resource Utilization For Each 1K Block ||||| Notes/Assignee | Available | Utilization | Errors/Messages |
| | | | 312a Assigned | 312b Intermediate | 312c Reserved | 312d Aging | 312e Admin | Donated to Pool? | | | |
|---|---|---|---|---|---|---|---|---|---|---|---|---|
| 903-489 | 2 | MALAKOFF | 907 | 0 | 1 | 35 | 4 | | | 53 | 90.70% | |
| 903-489 | 3 | MALAKOFF | 656 | 0 | 5 | 83 | 0 | | | 256 | 65.50% | |
| 903-489 | 4 | MALAKOFF | 88 | 0 | 4 | 39 | 1 | | | 868 | 8.80% | |
| 903-489 | 5 | MALAKOFF | 0 | 0 | 0 | 0 | 0 | X | | 1000 | DONATED | |
| 903-489 | 6 | MALAKOFF | 0 | 0 | 0 | 0 | 0 | X | | 1000 | DONATED | |
| 903-489 | 7 | MALAKOFF | 0 | 0 | 0 | 0 | 0 | X | | 1000 | DONATED | |
| 903-489 | 8 | MALAKOFF | 105 | 0 | 0 | 68 | 0 | | | 827 | 10.50% | |
| 903-489 | 9 | MALAKOFF | 98 | 0 | 0 | 2 | 0 | | | 900 | 9.80% | |
| 903-498 | 0 | KEMP | 241 | 0 | 0 | 23 | 1 | | | 735 | 24.10% | |
| 903-498 | 1 | KEMP | 258 | 0 | 0 | 82 | 1 | | | 659 | 25.80% | |
| 903-498 | 2 | KEMP | 587 | 0 | 0 | 134 | 2 | | | 277 | 58.70% | |
| 903-498 | 3 | KEMP | 883 | 0 | 0 | 34 | 1 | | | 82 | 88.30% | |
| 903-498 | 4 | KEMP | 355 | 0 | 0 | 167 | 0 | | | 478 | 35.50% | |
| 903-498 | 5 | KEMP | | | | | | | | | | |

North American Numbering Plan
Numbering Resource Utilization/Forecast Report
Form F-1b - FORECAST REPORTING FORM (FOR POOLING CARRIERS)
(GROWTH THOUSAND BLOCKS)

>>> Please See The Instructions Before Completing This Form <<<

☐ *Check this box if the data on this form replaces the data on a previously submitted form.*

| Go To The Main Menu | | Go To Initial Forecast Form F-1a | | Check the Data Before Submitting |

314 ↙

| | |
|---|---|
| Parent Company Name | Sprint |
| Service Provider Name | SPRINT/UNITED TELEPHONE CO. OF TE |
| Company Address | 665 Lexington Ave |
| Address 2 | <Address 2> |
| City | Mansfield |
| State | OH |
| Zip | 44907 |
| Contact name | Cory Hames |
| Contact Tel # | 419-755-8746 |
| Fax #: | 419-756-5016 |
| E-mail | cory.l.hames@mail.sprint.com |

316 ↙

| | | |
|---|---|---|
| Parent Company OCN(s) | NONE | |
| Service Provider OCN | 2084 | |
| Service Provider FRN | 0005051768 | |
| SP Service Type | Incumbant Local Exchange Carrier (ILEC) | |

All Changes to Parent Company Name, Service Provider Name, Address, Contact Information, OCN(s), FRN and Service Type must be made on the Company Info page.

TO FIG. 3B-2

FROM FIG. 3B-1

318

| NPA | Rate Center Abbreviation | State Abbreviation | Pooling Area Forecast In 1K Blocks Per Rate Center, Per Year (Growth 1K Blocks) | | | | | Total 1K Blocks | Errors/Messages |
| --- | --- | --- | --- | --- | --- | --- | --- | --- | --- |
| | | | Year 1 | Year 2 | Year 3 | Year 4 | Year 5 | | |
| 254 | GATESVILLE | TX | 0 | 0 | 0 | 0 | 0 | 0 | |
| 254 | STEPHENVL | TX | 0 | 0 | 0 | 0 | 0 | 0 | |
| 903 | ARP | TX | 0 | 0 | 0 | 0 | 0 | 0 | |
| 903 | CAYUGA | TX | 0 | 0 | 0 | 0 | 0 | 0 | |
| 903 | COMMERCE | TX | 0 | 0 | 0 | 0 | 0 | 0 | |
| 903 | COOPER | TX | 0 | 0 | 0 | 0 | 0 | 0 | |
| 903 | EUSTACE | TX | 0 | 0 | 0 | 0 | 0 | 0 | |
| 903 | KERENS | TX | 0 | 0 | 0 | 0 | 0 | 0 | |
| 903 | MABANK | TX | 0 | 0 | 0 | 0 | 0 | 0 | |
| 903 | MALAKOFF | TX | 0 | 0 | 0 | 0 | 0 | 0 | |
| 903 | MURCHISON | TX | 0 | 0 | 0 | 0 | 0 | 0 | |
| 903 | PALESTINE | TX | 0 | 0 | 0 | 0 | 0 | 0 | |
| 903 | PAYNE SPG | TX | 0 | 0 | 0 | 0 | 0 | 0 | |

North American Numbering Plan
Numbering Resource Utilization/Forecast Report
Form F-2b - FORECAST REPORTING FORM (FOR NON-POOLING CARRIERS IN POOLING AREAS)
(GROWTH CODES)

>>> Please See The Instructions Before Completing This Form <<<

☐ Check this box if the data on this form replaces the data on a previously submitted form.

| Go To The Main Menu | Go To Initial Forecast Form F-2a | | Check the Data Before Submitting |

320 ↙

| | |
|---|---|
| Parent Company Name | Sprint |
| Service Provider Name | SPRINT/UNITED TELEPHONE CO. OF TE |
| Company Address | 665 Lexington Ave |
| Address 2 | <Address 2> |
| City | Mansfield |
| State | OH |
| Zip | 44907 |
| Contact name | Cory Hames |
| Contact Tel # | 419-755-8746 |
| Fax #: | 419-756-5016 |
| E-mail | cory.l.hames@mail.sprint.com |

322 ↙

| | |
|---|---|
| Parent Company OCN(s) | NONE |
| Service Provider OCN | 2084 |
| Service Provider FRN | 0005051768 |
| SP Service Type | Incumbant Local Exchange Carrier (ILEC) |

All Changes to Parent Company Name, Service Provider Name, Address, Contact Information, OCN(s), FRN and Service Type must be made on the Company Info page.

TO FIG. 3C-2

FROM FIG. 3C-1

324

| NPA | Rate Center Abbreviation | State Abbreviation | Forecast Reported in NXX(s) Per Rate Center, Per Year (Growth Codes) | | | | | Total NXX(s) | ERRORS/MESSAGES |
|---|---|---|---|---|---|---|---|---|---|
| | | | Year 1 | Year 2 | Year 3 | Year 4 | Year 5 | | |
| 254 | BREMOND | TX | 0 | 0 | 0 | 0 | 0 | 0 | |
| 254 | DUBLIN | TX | 0 | 0 | 0 | 0 | 0 | 0 | |
| 254 | FLAT | TX | 0 | 0 | 0 | 0 | 0 | 0 | |
| 254 | GROESBECK | TX | 0 | 0 | 0 | 0 | 0 | 0 | |
| 254 | HAMILTON | TX | 0 | 0 | 0 | 0 | 0 | 0 | |
| 254 | HICO | TX | 0 | 0 | 0 | 0 | 0 | 0 | |
| 254 | JONESBORO | TX | 0 | 0 | 0 | 0 | 0 | 0 | |
| 254 | KOSSE | TX | 0 | 0 | 0 | 0 | 0 | 0 | |
| 254 | POTTSVILLE | TX | 0 | 0 | 0 | 0 | 0 | 0 | |
| 254 | THORNTON | TX | 0 | 0 | 0 | 0 | 0 | 0 | |
| 903 | ATHENS | TX | 0 | 0 | 0 | 0 | 0 | 0 | |
| 903 | BROWNSBORO | TX | 0 | 0 | 0 | 0 | 0 | 0 | |
| 903 | BULLARD | TX | 0 | 0 | 0 | 0 | 0 | 0 | |

North American Numbering Plan
Numbering Resource Utilization/Forecast Report
Form F-3b - FORECAST REPORTING FORM (FOR CARRIERS IN NON-POOLING AREAS)
(GROWTH CODES)

>>> Please See The Instructions Before Completing This Form <<<

☐ Check this box if the data on this form replaces the data on a previously submitted form.

| Go To The Main Menu | | Go To Initial Forecast Form F-3a | | Check the Data Before Submitting |

326 →

| Parent Company Name | Sprint |
| Service Provider Name | SPRINT/UNITED TELEPHONE CO. OF TE |
| Company Address | 665 Lexington Ave |
| Address 2 | <Address 2> |
| City | Mansfield |
| State | OH |
| Zip | 44907 |
| Contact name | Cory Hames |
| Contact Tel # | 419-755-8746 |
| Fax #: | 419-756-5016 |
| E-mail | cory.l.hames@mail.sprint.com |

328 →

| Parent Company OCN(s) | NONE |
| Service Provider OCN | 2084 |
| Service Provider FRN | 0005051768 |
| SP Service Type | Incumbant Local Exchange Carrier (ILEC) |

All Changes to Parent Company Name, Service Provider Name, Address, Contact Information, OCN(s), FRN and Service Type must be made on the Company Info page.

330 →

| | | Forecast Reported in NXX(s) Per NPA, Per Year (Growth Codes) | | | | | | |
|---|---|---|---|---|---|---|---|---|
| NPA | State Abbreviation | Year 1 | Year 2 | Year 3 | Year 4 | Year 5 | Total NXX(s) | Errors/Messages |
| <NPA> | <St> | 0 | 0 | 0 | 0 | 0 | 0 | | though
SYSTEM AND METHOD FOR REPORTING TELECOMMUNICATIONS UTILIZATION AND FORECASTING

BACKGROUND

The ten-digit North American Numbering Plan (NANP) currently used by the United States and 19 other countries is rapidly being depleted. Management of this resource is impaired by a lack of uniform data. Under the Communications Act of 1934, as amended by the Telecommunications Act of 1996, the Federal Communications Commission (FCC) was given "exclusive jurisdiction over those portions of the North American Numbering Plan that pertain to the United States." Pursuant to that authority, the FCC conducted a rulemaking that, among other things, addressed regular reporting on numbering resources used by United States telecommunications carriers.

The FCC appointed an agency, known as the North American Numbering Plan Administrator NANPA), to monitor numbering resources utilized by all telecommunications carriers using the resources and to project the dates of area code and North American Numbering Plan exhaust. In their duties, NANPA created a numbering utilization report that telecommunications carriers are to submit semi-annually. The report is known as the Numbering Resource Utilization/Forecast (NRUF) Report.

The NRUF Report includes a number of different forms that provide NANPA with information as to the usage of telecommunications allotted phone numbers. As understood in the telecommunications industry, each telecommunications carrier is allotted a certain number of phone numbers in blocks of 10,000, which is generally subdivided into ten blocks of a thousand. Ten-digit phone numbers include a (i) numbering plan area (NPA) (i.e., area code), which is three digits, (ii) central office code (NXX), which is also three digits, and (iii) thousands digit block (i.e., the first digit of the last four digits of a phone number). Telecommunications carriers provide phone numbers to customers from these blocks of a thousand numbers. As a thousands block is filled, it is considered to be exhausted. Some thousands digit blocks become filled while others become empty depending on how the telecommunications carrier customer base changes. The telecommunications carrier reports the existing usage and forecasts future usage of the phone numbers in the NRUF Report.

One problem that exists with the NRUF Report is the time necessary to collect and process the information to report. Telecommunications carriers generally have many divisions, many central offices, thousands of thousands digit blocks, and millions of customers. Managing this information and reporting it can take several man-weeks for producing each NRUF Report. Another problem that exists is that there is no standard method for forecasting exhaustion of a thousands digit block.

SUMMARY

To overcome the problems that exist for telecommunications carriers in reporting telephone number usage and forecasting exhaustion of thousands digit blocks, the principles of the present invention provide for a system and method for accessing information stored in multiple databases and processing the information to populate the NRUF Report.

One embodiment includes a system for forecasting and reporting telecommunication usage by a telecommunications carrier. The system may include a first database that stores data indicative of telephone number usage of telephone numbers assigned to the telecommunications carrier and a computing device in communication with a second database via a network and containing telephone number usage information associated with multiple telecommunications carriers. Software may be executed by the computing device to query the first database and the second database to retrieve information from the first and second databases to generate telephone number usage and forecast data from the information of the databases. The software may further be executed to populate fields of a report with the telephone number usage and forecast data to be submitted to a telecommunications reporting agency. The first database maybe internal to the telecommunications carrier and the second database may be a database available to the telecommunications industry. In one embodiment, the second database is the local exchange routing guide (LERG) database. The software may also be executed to query a third database available to the telecommunications industry to provide pooling information associated with each NPA to direct the software to populate the correct NRUF form with usage and forecast information.

Another embodiment includes a method for forecasting and reporting telecommunications usage by a telecommunications carrier. The method includes storing data indicative of telephone number usage of telephone numbers assigned to the telecommunications carrier in a first database. The first database may be queried to obtain a first set of data including telephone number information associated with the telecommunications carrier. A second database operating on a network may be queried to obtain a second set of data including telephone number information associated with the telecommunications carrier. Telephone number usage and forecast data may be generated from the first and second sets of data.

BRIEF DESCRIPTION OF THE DRAWINGS

A more complete understanding of the method and apparatus of the present invention may be obtained by reference to the following Detailed Description when taken in conjunction with the accompanying Drawings wherein:

FIGS. 3A-3D are exemplary completed NRUF forms;

DETAILED DESCRIPTION OF DRAWINGS

Figure 1:
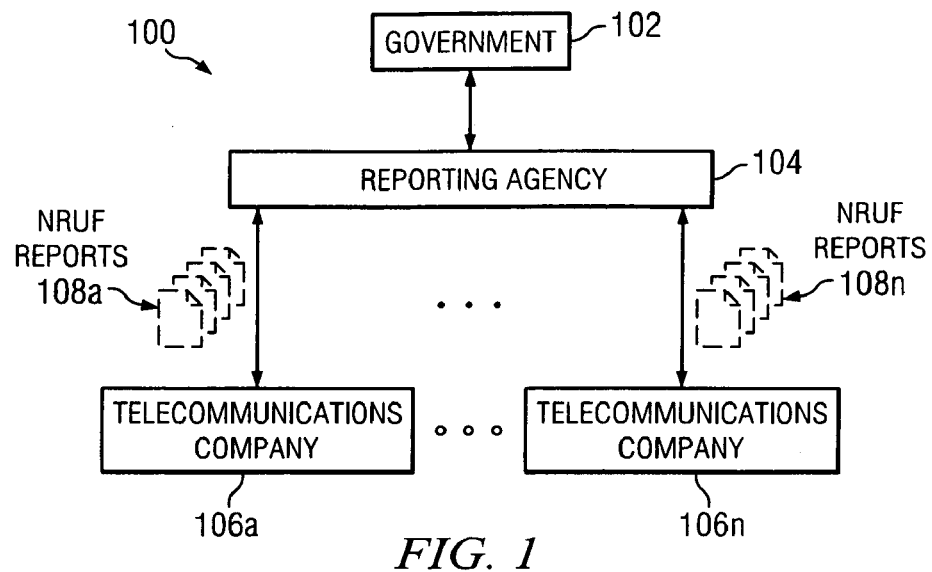
FIG. 1 is an illustration of an exemplary organizational structure for fulfilling governmental telecommunications telephone number usage reporting requirements.

FIG. 1 is an illustration of an exemplary organizational structure for fulfilling governmental telecommunications telephone number usage reporting requirements. As shown, a governmental organization, such as the Federal Communications Commission (FCC, sets guidelines and mandates for the telecommunications industry for reporting telecommunications usage. The telecommunications usage includes telephone number usage so that planning of additional phone numbers across the United States may be adequately planned to avoid reaching a telephone number exhaust situation in any particular region.

To help manage the reporting by the telecommunications industry, a reporting agency 104, currently known as the North American Numbering Plan Administration (NANPA), has been established. Telecommunication companies 106a-106n (collectively 106) provide telecommunications services to customers, including using and managing telephone numbers. As mandated by the government, the telecommunications companies 106 are to file semi-annual Number Resource Utilization/Forecast Reports (NRUF) 108a-108n (collectively 108) that show telephone number utilization and forecasting of the telephone numbers for which the respective telecommunications companies are responsible.

Figure 2:
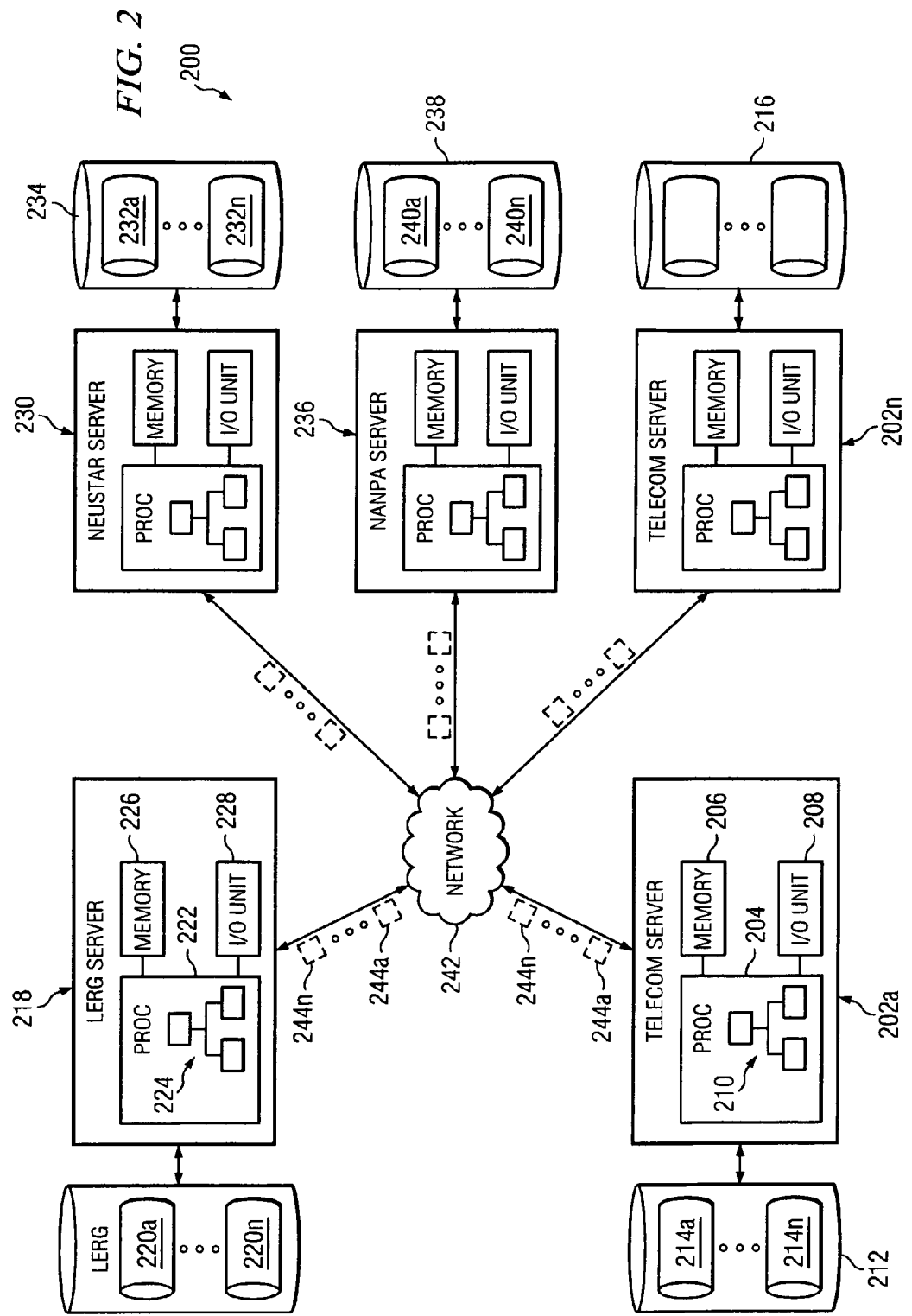
FIG. 2 is a block diagram of a system configuration for fulfilling governmental telecommunications telephone number usage reporting requirements.

FIG. 2 is a block diagram of a system configuration 200 for fulfilling governmental telecommunications telephone number usage reporting requirements. The system configuration includes a variety of servers and databases for use in storing and retrieving data associated with telecommunications usage.

Telecommunications servers 202a-202n (collectively 202) may be utilized to process telecommunications usage and forecasting of the respective companies by one or more telecommunications companies. Server 202a may include a processor 204 in communication with a memory 206 that is used for storing data and software and an input/output (I/O) unit 208 for communicating outside of the telecommunication server 202a. Software 210 may be executed by the processor 204 for performing data collection and processing of telecommunication usage and forecasting for the respective telecommunications company. A storage unit 212, which may be contained within the telecommunications server or located remotely from the telecommunications server 202a, is used to store telecommunications usage information in one or more databases 214a-214n (collectively 214). The databases 214 may store telephone numbers assigned to the telecommunications company and usage of those telephone numbers by customers of the telecommunications company. As shown, telecommunications server 202n may include the same or similar components as telecommunications server 202a and store data in an associated storage unit 216. In one embodiment, the telecommunications servers 202 are used by the same telecommunications company having one or more divisions located across several states and regions within each state, but manage information associated with each of the respective divisions in which the telecommunications servers operate.

As understood in the telecommunications community, a LERG server 218 is managed by Telcordia Technologies, Inc. to manage the LERG database 220a-220n (collectively 220). The LERG database 220 stores the North American Numbering Plan (NANP) which governs the management of telephone number resources for the public switched telephone networks in North America, including Canada, the United States, the Caribbean, and territories, within the international country code '1'. The LERG database 220 has data for every switch and central office in the North American telephone network The LERG server 218 includes a processor 222 and software 224 for communicating with the LERG database 220. Memory 226 and an I/O unit 228 are in communication with the processor 222 for storing information and communicating with the LERG database 220 and with the telecommunications servers 202.

NeuStar® is an administrator of the thousands-block number pooling in the United States. As the pooling administrator, NeuStar has telecommunications companies 106 (FIG. 1) submit information to them about phone number resources that are allocated. Each telecommunications company submits the information for each NPA and rate center of the company. A NeuStar server 230 is operated by NeuStar. The NeuStar server 230 may include the same or similar components as the LERG server 218. The NeuStar server 230, however, operates to manage different databases 232a-232n (collectively, 232) stored on a storage system 234, which may or may not be a part of the NeuStar server 230. As understood, the NeuStar databases 232 may store information for all telecommunications companies, including forecasted demand, blocks assigned, blocks returned, blocks donated, blocks added to the pool from new codes, and blocks available, for example. This information collected by the NeuStar server 230 may aggregate the information to provide historical information to the telecommunications industry and forecast information for the telecommunications industry so that telephone number resources may be planned going forward and trends may be determined. Contents of the NeuStar databases 232 may be utilized in accordance with the principles and the present invention.

A NANPA server 236, which may include the same or similar components as the LERG server 218 may be used to manage information being submitted to NANPA from the telecommunications companies 106. The storage unit 238 may include databases 240a-240n (collectively 240) for storing the information. In one embodiment, the databases 240 store NRUF reports 108 (FIG. 1), which may be in the form of Excel spreadsheets, PDF images, or raw content as specified by NANPA. The NRUF reports stored in the databases 240 may be utilized by NANPA, the reporting agency 104 (FIG. 1), or other reporting agencies directed by the government to manage phone number resources in the United States.

Each of the servers shown may be in communication with one another via a network 242.

In one embodiment, the network 242 is the Internet. Alternatively, other public or private networks, including wired, wireless, satellite, or any other configuration may be utilized in accordance with the principles and the present invention for providing communication services between each of the servers. As shown, communication over the network 242 is performed via data packets 244a-244n as understood in the art. Other types of communication protocols may be utilized in accordance with the principles and present inventions. While only three databases, the LERG database 220, NeuStar database 232, and NANPA database 240 are shown, it should be understood that other and/or additional databases that provide information associated with the telecommunications industry and including information for use in completing NRUF reports may be utilized.

FIGS. 3A-3D are exemplary completed NRUF forms. The forms are used for reporting telephone number usage by each of the telecommunications companies 106. A complete NRUF report contains 12 forms for collecting utilization and forecast data from telecommunications carriers. However, only four of the twelve are provided for exemplary purposes because many of the others are not utilized or seldom utilized due to being used for specific purposes or seldom including information that needs to be reported. It should be understood that the principles of the present invention maybe utilized for completing a full NRUF report.

Figures 1, 3A:
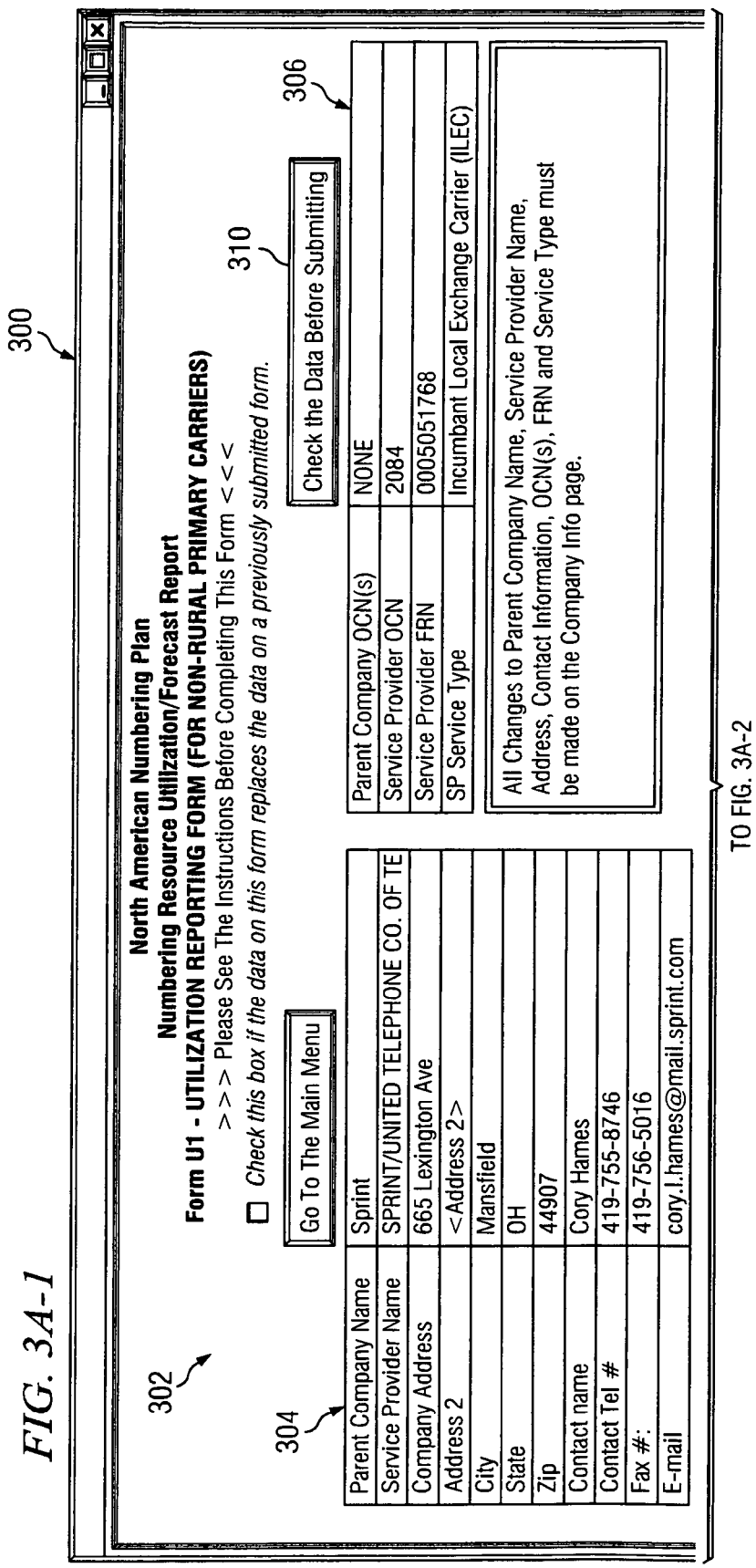

FIG. 3A is an exemplary form U1 Utilization Reporting Form (for non-rural primary carriers). This form is used for non-rural primary carriers to report at the thousands block level per rate center. This form, as well as the other NRUF forms, are configured in Microsoft Excel® and include a header portion 302 for the telecommunication company to enter company information in tables 304 and 306. The information provided may include service provider name, company address, city, state, zip code, contact name, contact telephone number, service provider OCN, service provider federal registration number (FRN), and service provider service type.

Another table 308 that includes numbering resource utilization for each thousands or 1 K block is completed by each telecommunications company 106 (FIG. 1). The information to be reported includes NPA-NXX, thousands digit ("X"), rate center abbreviations, assigned numbers, intermediate numbers, reserved numbers, aging numbers, administrative numbers, donated to pool indicators, notes/assignee information, available numbers, utilization percentages, errors/messages, etc. The first ten columns are filled in by the telecommunications carriers based on utilization by customers being supported in each NPA-NXX-X (i.e., first two columns of table 308). Available numbers, utilizations, and errors/messages are computed based on the resources being utilized by the telecommunications company for each NPA-NXX-XY Five categories are required to be reported in the U1 Utilization Reporting Form, including "assigned," "intermediate," "reserved," "aging," and "administrative." These categories are defined in FCC Order 00-104. A sixth category, "available," is automatically calculated and no entry is necessary. Clicking on a soft-button 310 causes the "available" data to be checked before submission. It should be understood that the forms provided in FIGS. 3A-3D are provided by the reporting agency 104 (FIG. 1) to each telecommunications company 106 for reporting numbering resource utilization and forecasting. One embodiment in accordance to the principles of the present invention provides for determining the utilization of the different categories (e.g., "assigned").

Definitions for the different utilization categories as described in the NRUF report are provided herein below for convenience purposes:

Assigned: Assigned numbers are defined as "numbers working in the public switched telephone network under an agreement such as a contract or tariff at the request of specific end users or customers for their use, or numbers not yet working but having a customer service order pending. Numbers that are not yet working and have a service order pending for more than five days shall not be classified as assigned numbers."

Intermediate: Intermediate numbers are defined as "numbers that are made available for use by another telecommunications carrier or non-carrier entity for the purpose of providing telecommunications service to an end user or customer." "An exception to this requirement is numbers reported for the purpose of transferring an established customer's service to another service provider, in which case the numbers are classified as "assigned" by the reporting carrier and not counted by the receiving carrier. For intermediate numbers provided by carriers to non-carrier entities, the providing carrier must report utilization for these numbers. Numbers assigned to end users by a non-carrier entity should be reported by the providing carrier as "assigned". Any remaining numbers held by a non-carrier entity that are not assigned to end users shall be reported by the providing carrier as "intermediate." The sum of numbers reported by the carrier for the non-carrier entity in these two categories should always equal the total of numbers held by the non-carrier entity.

Reserved: Reserved numbers are defined as "numbers that are held by service providers at the request of specific end users or customers for their future use." Numbers held for specific end users or customers more than 180 days shall not be classified as reserved numbers.

Aging: Aging numbers are defined as "disconnected numbers that are not available for assignment to another end user or customer for a specific period of time." "Numbers previously assigned to residential customers may be aged for no more than 90 days. Numbers previously assigned to business customers maybe aged for no more than 365 days."

Administrative: Administrative numbers are defined as "numbers used by telecommunications carriers to perform internal administrative or operational functions necessary to maintain reasonable quality of service standards."

Donated to Pool: An "X" is entered in this column if the NPA-NXX-X block has been donated to a pool.

FIGS. 3B-3D show exemplary forms F-1b, F-2b, and F-3, respectively. These forms are used to report forecasting of telephone number resources. More specifically, Form F-1b is used for pooling carriers to report forecasts for each NPA and rate center, Form F-2b is used for non-pooling carriers in pooling areas for forecasting for each NPA, and Form F-3b is used for carriers in non-pooling areas for forecasting for each NPA and rate center. Similar to FIG. 3A, multiple tables are provided in each of FIGS. 3B-3D for header information and reporting information. It should be understood that one skilled in the art of telecommunications resource reporting is well versed in utilizing these resource utilization and forecast report forms.

FIG. 3B is an exemplary Form F-1b that is part of the NRUF Report submitted on a semi-annual basis by telecommunications service providers 106 (FIG. 1). Pooling carriers, where a pooling carrier is a telecommunications carrier that has pooled telephone number resources in certain rate center locations, fill out Form F-1b when submitting the NRUF Report. Form F-1b includes a header portion with tables 314 and 316 that is filled out with information associated with the telecommunications service provider, such as parent company name, service provider name, address, service provider operator company number (OCN), service provider federal registration number, service type, etc. In addition, telecommunications service providers 106 fill out a forecast table 318 for forecasting pooling areas in 1 K blocks per rate center, per year and 1 K blocks (growth codes) over the next five years. It will be seen that this forecasting is different from forms F-2b FIG. 3) and forms F-3b (FIG. 3D) as form F-1b requests forecasting for 1 K blocks, whereas forms F-2b and F-3b request forecasting for 10 K blocks (i.e., NXX level blocks). Also, forecasting information associated with each rate center in an NPA is submitted in Form F-1b.

FIG. 3C is an exemplary Form F-2b that is part of the NRUF Report. Non-pooling carriers, where a non-pooling carrier is a telecommunications carrier that has not pooled telephone number resources in certain rate center locations, fills out Form F-2b when submitting the NRUF Report.

The Form F-2b includes a header portion having tables 320 and 322 to be filled with information associated with the telecommunications service provider, as described with regard to Form F-1b of FIG. 3B. The telecommunications service providers 106 fill out a forecast table 324 for forecasting NXX(s) per rate center, per year (growth codes) over the next five years. As shown, the forecast table 324 requests NPA and rate centers, but is performed on a 10 K block level as opposed to the 1 K block level of Form F-1b (FIG. 3B).

FIG. 3D is an example Form F-3b that is part of the NRUF Report. Telecommunications carriers in non-pooling areas, which are areas in which pooling has not been initiated yet, fill out Form F-3b when submitting the NRUF Report. The Form F-3b includes a header portion including tables 326 and 328 to be filled out with information associated with the telecommunications service provider, as described with regard to FIG. 3B. The telecommunications service providers 106 fill out a forecast table 330 for forecasting NXX(s) per NPA, per year (growth codes) over the next five years. As shown, the forecast table 328 requests NPAs and is performed on a 10 K block level as opposed to the 1 K block level of form F-1b (FIG. 3B).

As understood in the art, the telecommunications carriers may use respective proprietary inventory databases (e.g., databases 214) to generate at least a portion of the information used for generating utilization and forecasting information to complete the NRUF forms.

Figure 4:
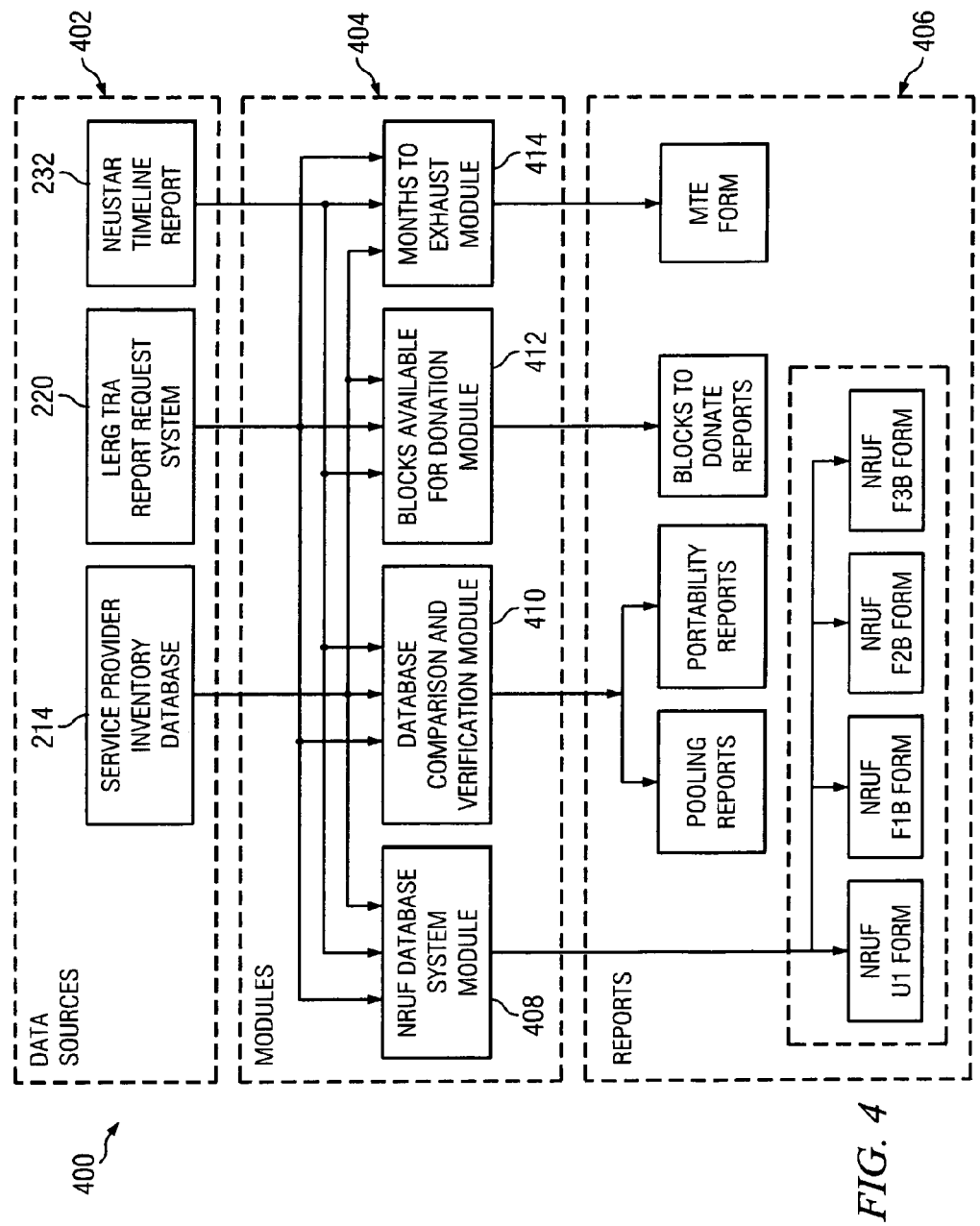
FIG. 4 is a block diagram of an exemplary system for gathering and processing information to complete NRUF forms.

FIG. 4 is a block diagram of an exemplary system 400 for gathering and processing information to complete the NRUF forms. The system may include data sources 402, modules 404, and reports 406. The data sources 402 may include a telecommunications service provider inventory database 214, LERG database 220, and NeuStar database 232. As shown in FIG. 2, the LERG database 220 and NeuStar database 232 are accessible via a network 242, such as the Internet. It should be understood that other databases currently available or developed in the future that include information available to be used to determine information for completing the NRUF forms may be utilized in accordance with the principles of the present invention.

The modules 404 include an NRUF database system module 408, database comparison and verification module 410, blocks available for donation module 412, months to exhaust module 414, and directory numbers available module 416. While the NRUF database system module 408 is of principal focus for completing the four NRUF forms of FIGS. 3a-3D, the other modules are briefly described hereinbelow.

NRUF Database System Module

The NRUF database system module 408 is used to collect and process information from the databases 214, 220, and 232 to fill-out the NRUF forms 418, which includes NRUF forms U1, F-1b, F-2b, and F-3b, as provided in FIGS. 3A-3D. The NRUF database system module 408 is the primary aspect of the remainder of this description.

Database Comparison and Verification Module

The database comparison and verification module 410 is a module used to extract information from both the telecommunications service provider database 214 and LERG database 220 and to compare the pooling statuses (i.e., every thousands block that the telecommunications service provider currently owns or had owned in the past) as well as the portability indicators stored in the respective databases. A report may be generated to shows all thousands blocks where there is a discrepancy between the sources.

Blocks Available for Donation Module

The blocks available for donation module 412 queries several data sources 402 to first find all thousands blocks currently owned by a telecommunications service provider that are at or less than 10% utilized or contaminated. In other words, if 100 or less of the 1000 numbers in the thousands block are currently unavailable for assignment, the thousands block is not considered to be over-contaminated. By being 10% or less utili1ed, the block is capable of being pooled back to the government. However, the telecommunications service provider would not necessarily want to donate all blocks in a rate center that are under-contaminated. The second factor that should be accounted for is the projected growth of a rate center. The telecommunications service provider should donate only enough thousands blocks to ensure that a rate center will not exhaust all phone numbers in the rate center within the next six months. This number of thousands blocks to donate is what a report from this module 412 illustrates. This module 412 lists the current under-contaminated thousands blocks and their respective percent utilizations. Users may filter results based on NPA, state, and rate center combinations.

Months to Exhaust Module

The months to exhaust module 414 automates the process for populating a Months-to-Exhaust Worksheet, which must be completed when a telecommunications carrier requests additional thousands blocks for growth in a rate center where the carrier already has resources assigned. It extracts information from both the telecommunications service provider database 214 and LERG database 220. The module then uses queries to group, subtotal, and filter data to meet the requirements for the worksheet. Calculations are automated to determine whether the six months to exhaust requirement and the minimum 75% utilization requirement are met.

Continuing with FIG. 4, the NRUF database system module 408 may be configured to query one or more databases to receive information for processing and completing NRUF forms. As shown, the NRUF forms, U1, F-1b, F-2b, and F-3b, may be completed by the NRUF database system module 408. However, it should be understood that the NRUF database system module 408 may be adapted to complete other NRUF forms in the same or similar manner.

Figure 5A:
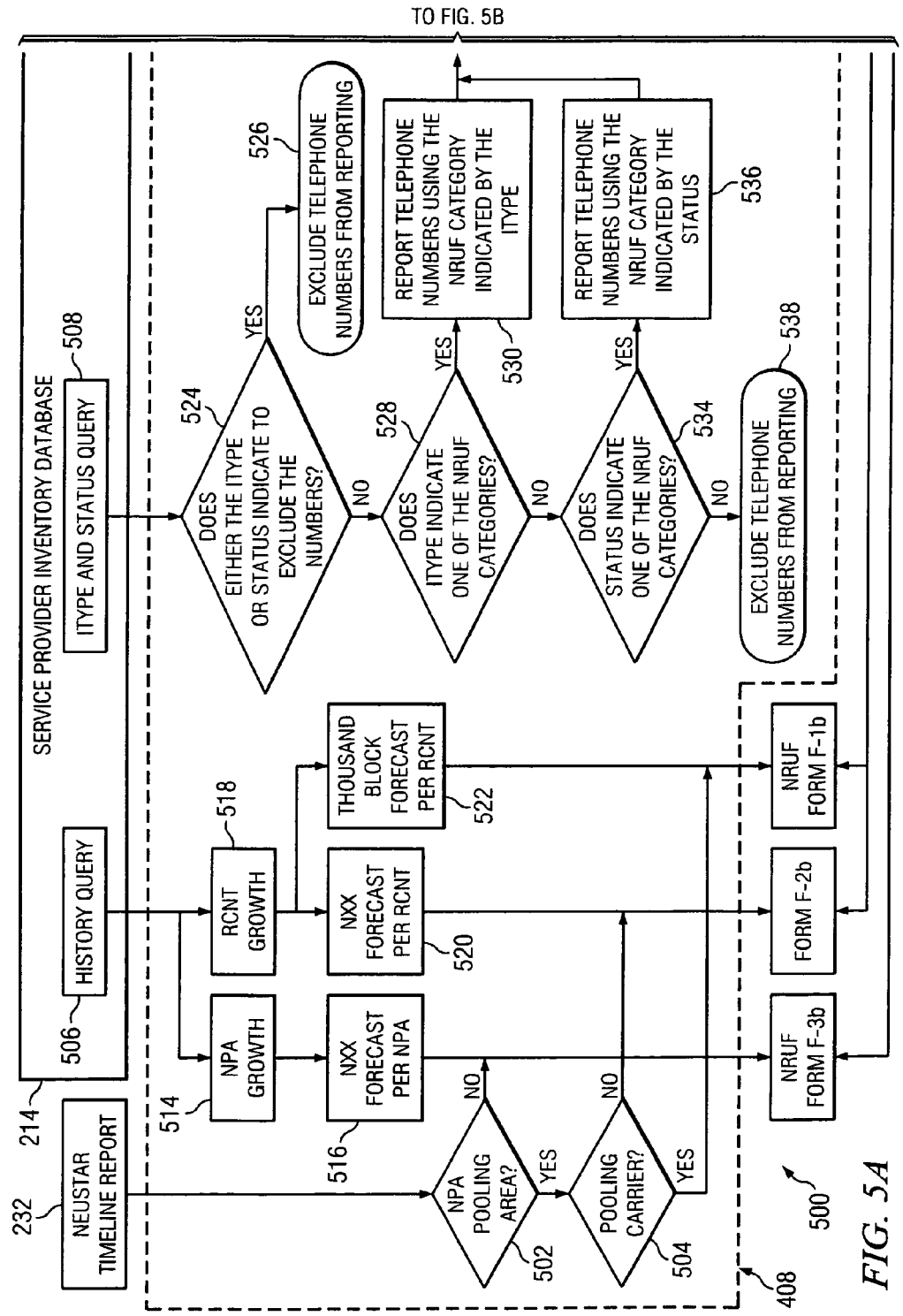
FIG. 5 is a more detailed block dram of the exemplary system of FIG. 4 for gathering and processing information to complete NRUF forms.
Figure 5B:
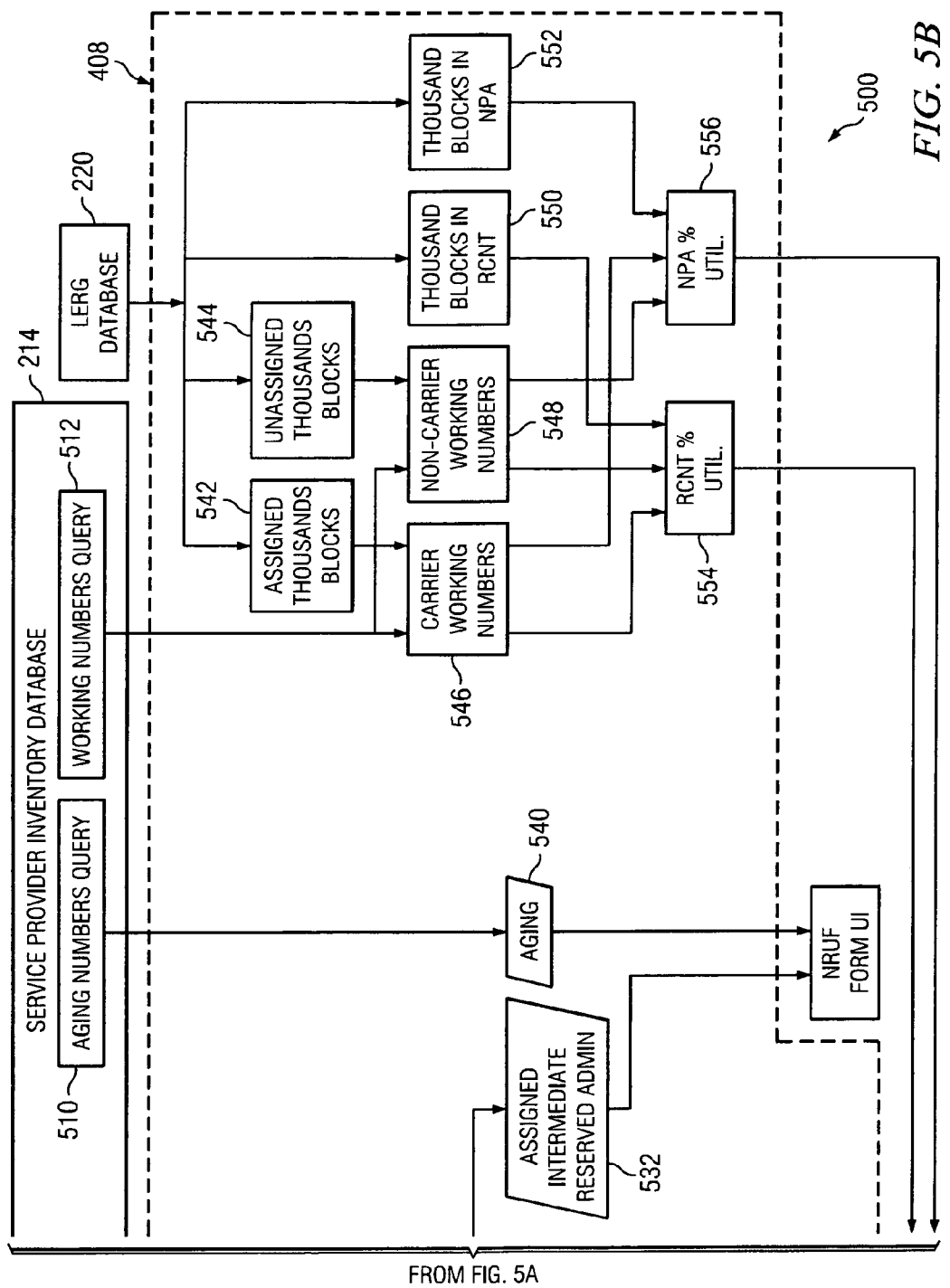

FIG. 5 is a more detailed block diagram 500 of the exemplary system of FIG. 4 for gathering and processing information to complete an NRUF report. As shown, three databases, including the service provider inventory database 214, LERG database 220, and NeuStar Timeline Report 232, may be accessed to obtain information to be used for completing the NRUF report. In one embodiment, two or more databases may be accessed, including an internal database to the service provider and a telecommunications industry accessible database (e.g., the LERG database 220), if enough information can be gathered from these databases to complete the NRUF report. However, based on the current configurations of the three databases, each is accessed to complete the NRUF reports in accordance with the principles of the present invention.

As previously described, (i) pooling carriers (i.e., those carriers in pooling areas who have donated or received numbers from the number pool) report forecasts by rate center on the F-1b form, (i) non-pooling carriers in pooling areas (i.e., carriers in pooling areas who have not donated or received numbers from the number pool) report forecasts by rate center on the F-2b form, and (iii) carriers operating in non-pooling areas (i.e., NPA areas that have not yet started pooling) report forecasts in NPA areas on the F-3b form. The determination as to which forms to report projections for particular NPA areas may be determined using the NeuStar database 232 and looking up the NeuStar Timeline Report. At this time, the NeuStar Timeline Report can be found at:

"https://www.nationalpooling.com/pas/control/
timelinereport?siteTyp=FR"

In one embodiment, the database or table that is stored at the above-listed website may be searched at the website. Alternatively, the contents of the database may be downloaded into a local software program (e.g., Microsoft Excel®) or database (e.g., Microsoft Access®) and queried therein.

In step 502, a query may be performed on the data from the NeuStar database 232 to determine whether an NPA is a pooling area. The NeuStar Timeline Report (not shown) includes, in part, state, NPA, and pool start date information. If the pool start date listed is prior to the current date, then the NPA is a pooling area. Otherwise, the NPA is a non-pooling area and Form F-3b is completed for those NPA areas. Unless an NPA is relatively new, most NPA areas are pooling areas, which is why the Form F-3b in FIG. 3D is empty. If the query in step 502 determines that the NPA is a pooling area, then in step 504, a query determines whether the telecommunications service provider is a pooling carrier in that NPA. In other words, a determination is made to determine if the service provider has ever pooled in the NPA. If so, then a forecast for the NPA is reported in Form F-1b. Otherwise, a forecast for the NPA is reported in Form F-2b.

As shown, four queries may be performed with the service provider inventory database, including a history query 506, installed type ITYPE & status query 508, aging numbers query 510, and working numbers query 512. The history query 506 and working numbers query 512 are used to complete Forms F-1b, F-2b, and F-3b and the other queries 508 and 510 are used to complete the U1 Form.

The history query 506 extracts or identifies the number of working phone numbers at rate center levels for each of the last 13 months from the service provider inventory database 214. TABLE I is representative of a portion of such an extraction. It should be understood that TABLE I is an exemplary portion of an overall database that includes working telephone numbers for all rate centers and NPAs of the telecommunications service provider. At step 514, NPA growth is determined for inclusion in form F-3b, if it is determined from step 502 that the NPA is not a pooling area. For example, referring to TABLE I below, if the current month is June 2006, month 13 (M13) would be the previous month (e.g., May 2006) since the current month is not complete. Month 1 (M1) would be May 2005. By using a rolling 13 months of history, month 1 can be subtracted from month 13 to derive the past year of growth (positive) or loss (negative). In the example of TABLE I, assuming that Decatur is the only rate center reported by the service provider, the growth of the NPA 940 is 22,886−21,316=1,570 phone number growth. If there are multiple rate centers served in this NPA, the working numbers would first be subtotaled at the NPA level. At step 516, an NXX forecast per NPA may be determined. The results are included in Form F-3b if the NPA is not a pooling area.

TABLE I

Working Numbers at Rate Centers Table

| ST | Rate Center | NPA | YRMO | Working |
|----|-------------|-----|------|---------|
| TX | DECATUR | 940 | M13 | 22886 |
| TX | DECATUR | 940 | M12 | 22887 |
| TX | DECATUR | 940 | M11 | 22875 |
| TX | DECATUR | 940 | M10 | 22841 |
| TX | DECATUR | 940 | M9 | 21741 |
| TX | DECATUR | 940 | M8 | 21781 |
| TX | DECATUR | 940 | M7 | 21801 |
| TX | DECATUR | 940 | M6 | 21871 |
| TX | DECATUR | 940 | M5 | 21879 |
| TX | DECATUR | 940 | M4 | 22647 |
| TX | DECATUR | 940 | M3 | 22641 |
| TX | DECATUR | 940 | M2 | 22098 |
| TX | DECATUR | 940 | M1 | 21316 |

At step 518, rate center growth may be determined based on the information from TABLE I in a similar manner as the NPA growth described with respect to step 514. In this case, rate center growth is calculated in the same manner and is the same as NPA growth (i.e., 1,570 phone numbers). If a service provider reported on multiple rate centers servicing a single NPA, which is often the case, then the growth for the rate center and NPA would likely be different. At step 520, an NXX forecast per rate center is generated. In one embodiment, the growth may be projected by using the same growth as computed for the past 13-months (i.e., 1,570 phone lines). Alternatively, a different technique may be used for projecting the growth, such as using a moving average or other statistical function. The results of the NXX forecast per rate center maybe applied to Form F-2b if it is determined at step 504 that the carrier is not a pooling carrier. If it is determined that the carrier is a pooling carrier, then the results of step 522, which determines the thousands block forecast per rate center, is applied to Form F-1b.

Continuing with the queries, the ITYPE & status query 508 reports subtotals for combinations of installed type and status at the NPA-NXX-X (thousands block) level. When blocks of telephone numbers are assigned to a carrier, the services for which the numbers can be used are limited. For example, a block of numbers may be assigned for paging services only. Assigning an installed type to numbers in a carrier's inventory database allows the carrier to follow regulations in assigning the numbers. The status field serves to report the current status of the phone number. For example, the status defines directory numbers that are assigned to working customers and those that are currently unassigned.

TABLE II is an exemplary partial listing of a telecommunications service provider inventory of telephone numbers. The list includes NPA-NXX-X, installation type, status, and quantity of numbers with a particular status. For example, the status "ASN" stands for "assigned," and there are four (4) phone numbers in the NPA-NXX-X of 219-261-2 that are assigned.

TABLE II

Service Provider Inventory Database

| NPA | NXX | X | ITYPE | STATUS | QTY |
|-----|-----|---|-------|--------|-----|
| 219 | 261 | 0 | REG | WKG | 1 |
| 219 | 261 | 0 | SPL | WKG | 1 |
| 219 | 261 | 2 | COIN | ASN | 4 |
| 219 | 261 | 2 | COIN | VAC | 1 |
| 219 | 261 | 2 | COIN | VND | 23 |
| 219 | 261 | 2 | COIN | WKG | 72 |
| 219 | 261 | 2 | REG | DNA | 1 |
| 219 | 261 | 2 | REG | LNPO | 2 |
| 219 | 261 | 2 | REG | VAC | 1 |
| 219 | 261 | 2 | REG | VND | 153 |
| 219 | 261 | 2 | REG | WKG | 741 |
| 219 | 261 | 2 | REG | WLNP | 2 |

TABLE III is a cross-reference table for the different ITYPE categories. For example, the ITYPE "BBDN" represents "broadband" service and "REG" represents "regular" service of customer telephone lines. TABLE IV is a cross-reference table for the status categories. For example, "ASN" represents phone numbers that are "assigned" and "WKG" represents phone numbers that have working service. Both of the ITYPE and status cross-reference tables are used in determining what information to report on the utility U1 form, as further described below with regard to the flow chart extending from the ITYPE & status query 508. It should be understood that TABLES III and IV are exemplary and that other and/or additional tables may be used in accordance with the principles of the present invention. It should also be understood that the content of the tables may be different or additional content may be utilized to perform the same or similar functionality as described herein. Furthermore, it should be understood that no tables may be used and cross-referencing of categories maybe performed by using software that includes cross-reference values by hard-coding or otherwise.

TABLE III

INSTALL TYPE CROSS-REFERENCE TABLE

| ITYPE | DESCRIPTION | EFFECT |
|---|---|---|
| 800 | 800 SERVICE | NO EFFECT |
| BBDN | BROADBAND | NO EFFECT |
| CNTX | CENTREX NUMBERS | NO EFFECT |
| COIN | COIN | NO EFFECT |
| DID | DIRECT IN DIAL SVC. | NO EFFECT |
| ISDN | INT SWITCH DIG NETWK | NO EFFECT |
| LNPI | LNP IN | EXCLUDE |
| MBAS | MILITARY BASE | NO EFFECT |
| MBEX | MILITARY PIN/NO DIAL | EXCLUDE |
| MCA | METRO CALLING AREA | NO EFFECT |
| MEXT | MESSAGE LINE EXT. | EXCLUDE |
| MSGL | MESSAGE LINE NUMBER | NO EFFECT |
| PAGE | PAGING | NO EFFECT |
| POOL | NUMBER POOLING | NO EFFECT |
| RECL | RECLAIMED | NO EFFECT |
| REG | REGULAR | NO EFFECT |
| SPL | SPECIAL BILLING (WO) | NO EFFECT |
| STGV | STATE GOVERNMENT NMBR | INTERMEDIATE |
| TEST | TEST | ADMINISTRATIVE |
| TLCO | COMPANY OFFICIAL NM | ADMINISTRATIVE |
| TNBR | TOTAL NUMBER SERVICE | NO EFFECT |
| NSTR | NEUSTAR'S BLOCK | NO EFFECT |
| PATS | CUSTOMER OWNED PHONE | NO EFFECT |
| PCS | PERSONAL COMM SVC | NO EFFECT |
| ROT | ROTARY HUNT | NO EFFECT |
| SWAD | TEST | ADMINISTRATIVE |
| WATS | OUT WATS | NO EFFECT |

TABLE IV

STATUS CROSS-REFERENCE TABLE

| STATUS | DESCRIPTION | EFFECT |
|---|---|---|
| ASN | ASSIGNED | ASSIGNED |
| CEAS | PORTED # DATABASE | ASSIGNED |
| DNA | DO NOT ASSIGN | ADMINISTRATIVE |
| JPY | JEOPARDY | ASSIGNED |
| LNPO | LNP OUT | ASSIGNED |
| RECL | RECLAIM SD | EXCLUDE |
| RES | RESERVED | RESERVED |
| SND | SENDING TO VND | EXCLUDE |
| VAC | VACANT | EXCLUDE |
| VACR | VACANT RELATED ORDER | ASSIGNED |
| VND | VACANT NUMBER DATABASE | EXCLUDE |
| WKG | WORKING SERVICE | ASSIGNED |
| WLNP | WORKING LNP SERVICE | ASSIGNED |
| CVR | CONNECT VACATION SVC | ASSIGNED |
| LNPP | LNP PENDING PORT | ASSIGNED |

Continuing with FIG. 5, the ITYPE & status query 508 accesses the service provider inventory database 214 to extract data, such as the data of TABLE II. The process continues at step 524, where a determination is made as to whether either the ITYPE or status indicates to exclude the numbers. For example, referring to TABLE II, for NPA-NXX-X of 219-261-2 having an ITYPE of "COIN" and status of "VND" (see row 5 of TABLE II), when the ITYPE cross-reference table (TABLE III) is cross-referenced, the effect for "COIN" is shown to have "NO EFFECT" (see row 4 of TABLE III) and when the status cross-reference table (TABLE IV) is cross-referenced, the effect for "VND" is "EXCLUDE" (see row 11 of TABLE IV). If at step 524 it is determined that either the ITYP or status is to be excluded, then at step 526, the telephone numbers are excluded from reporting. Therefore, in the instant example, the 23 phone numbers in 219-261-2 that have a status of "VND" are excluded from reporting.

If at step 524 it is determined that neither the ITYPE or status indicate to exclude the numbers, then at step 528, a determination is made as to whether the ITYPE indicates one of the five NRUF categories (i.e., "assigned," "intermediate," "reserved," "aging," "administrative"). For example, if one of the NPA-NXX-X ITYPE data elements were "TEST," then the effect would be found in TABLE III as being "ADMINISTRATIVE," which is one of the NRUF categories. If the ITYPE indicates one of the NRUF categories at step 528, then the process continues at step 530, where the number of telephone numbers using the NRUF category indicated by the ITYPE is reported. The process continues at step 532 to report the number of telephone numbers that meets one of the categories "Assigned," "Intermediate," Reserved," or "Administrative" on the U1 form.

If it is determined at step 528 that the ITYPE is not one of the NRUF categories (e.g., "NO EFFECT"), then the process continues at step 534, where a determination is made as to whether the status is one of the NRUF categories. For example, referring to TABLE II, for NPA-NXX-X of 219-261-2 having ITYPE and status of "COIN" and "ASN," the effect found in TABLE IV is "ASSIGNED," which is one of the NRUF categories. If it is determined at step 534 that the status is an NRUF category, then the process continues at step 536 where the number of telephone numbers using the NRUF category indicated by the status is reported. For the case of 219-261-2 having ITYPE and status of "COIN" and "ASN," there are 4 telephone numbers that are reported. As another example, referring to TABLE II, for NPA-NXX-X of 219-261-2 having ITYPE and status of "REG" and "WKG," the quantity of 741 numbers are reported as being "ASSIGNED" on the U1 Form (FIG. 3A). The process continues at step 532 to report the numbers on the U1 form. If, at step 534, the status does not indicate one of the NRUF categories, then the process continues at step 538, where the telephone numbers are excluded from reporting.

Continuing with the queries, the aging numbers query 510 is used to report subtotals for aging numbers at an NPA-NXX-X (thousands block) level. TABLE V shows a subset of the service provider inventory database 214 with aging data. The aging data is reported via step 540 on the U1 Form (FIG. 3A).

TABLE V

Inventory Data with Telephone Number Aging Information

| NPA | NXX | X | AGING |
|---|---|---|---|
| 219 | 261 | 2 | 46 |
| 219 | 261 | 3 | 22 |
| 219 | 261 | 4 | 3 |
| 219 | 275 | 2 | 4 |
| 219 | 275 | 3 | 9 |
| 219 | 275 | 4 | 7 |
| 219 | 275 | 5 | 8 |
| 219 | 275 | 6 | 3 |

Continuing with the queries, the working numbers query 512 reports working numbers at the NPA-NXX-X (thousands block) level that are designated as being working. TABLE VI shows a subset of the service provider inventory database 214 with working telephone number data. The working numbers are used in combination with the data from the LERG database 220.

TABLE VI

Inventory Data with Working Telephone Number Information

| NPA | NXX | X | WORKING |
|-----|-----|---|---------|
| 218 | 534 | 0 | 33 |
| 218 | 534 | 1 | 74 |
| 218 | 534 | 2 | 69 |
| 218 | 534 | 3 | 569 |
| 218 | 534 | 4 | 97 |
| 218 | 534 | 5 | 79 |
| 218 | 534 | 7 | 18 |
| 218 | 534 | 9 | 72 |

At step 542 and 544, assigned thousands blocks (i.e., blocks currently allocated to the reporting carrier) and unassigned thousands blocks (i.e., blocks not currently allocated to the reporting carrier), respectively, are collected from the LERG database 220. Carrier working numbers (i.e., the reporting carrier's working customers whose numbers reside in a thousand block owned by the reporting carrier) are determined at step 546 and non-carrier working numbers (i.e., the reporting carrier's working customers whose numbers do not reside in a thousand block owned by the reporting carrier) are determined at step 548. Thousand blocks in each rate center (i.e., the number of thousands blocks owned by the reporting carrier for each rate center) are determined at step 550 and thousand blocks in each NPA (i.e., the number of thousands blocks owned by the reporting carrier for each NPA) are determined at step 552. Rate center percent utilization is determined at step 554 and NPA percent utilization is determined at step 556. These values are used to complete the NRUF Forms F-1b, F-2b, and F-3b.

$$RTCTR \% \ Util = \frac{CarrierWkg + NonCarrierWkg}{NonCarrierWkg + (1000)(ThouBlocksInRateCenter)}$$

$$NPA \% \ Util = \frac{CarrierWkg + NonCarrierWkg}{NonCarrierWkg + (1000)(ThouBlocksInNPA)}$$

The principles of the present invention determine which thousands blocks the company is responsible to report utilizing information stored in the LERG database 220. For example, with number portability and number pooling, Company A may have customers in thousands blocks that are owned by Company B. Company A should not report utilization for these thousands blocks because Company B will report those numbers. To determine which blocks should be reported, the LERG database 220 is used as the determining data source. All blocks that are listed in the LERG have a corresponding operating company number (OCN). All thousands blocks listed in the LERG database 220 with an OCN that belongs to a particular carrier should be reported in the carrier's NRUF filings. However, this criteria alone does not include all necessary thousands blocks. If all of the thousands blocks in a NPA-NXX belong to one carrier and the blocks have not been pooled, then only the NPA-NXX shows up in the LERG database 220 rather than one record for each thousands block. To compensate for this, the process 500 splits these NPA-NXX's into all ten thousands blocks (0 through 9) for the blocks to report. Those blocks that were once owned by a company and donated back to the government without yet being reassigned should also be reported on the company's NRUF filings. These blocks are determined by meeting the following three conditions:

1) The NPA-NXX is listed in the LERG database 220 with one of the company's OCN's.

2) The NPA-NXX is split out in the LERG database 220 to include one or more thousands blocks, rather than just one record for the whole NPA-NXX.
3) One or more of the thousands blocks for the NPA-NXX's is not listed in the LERG database 220.

If each of these conditions is met, then those blocks not listed in the LERG database 220 are the additional blocks that should be included in the list of blocks to report. These blocks are marked with an "X", indicating that the block has been pooled.

In the following example shown in TABLE V, for NPA-NXX 419-520, a telecommunications company having OCN 0661 is the code holder of the NPA-NXX as indicated by the first line with a block ID of "A" for all. Since the thousand blocks are broken out into individual records, but only eight of the ten blocks are listed in the LERG database 220, this means that blocks 7 and 9 are unassigned blocks. The blocks 7 and 9 have been pooled by one company, but not yet reassigned to another company, so these blocks are still to be reported by the pooling company. Blocks 5 and 8 have been pooled and reassigned to a company other than the pooling company having OCN 553A, so these blocks are not be reported by the pooling company.

TABLE VII

Pooling Example

| State | Rate Center | NPA | NXX | Block_ID | OCN |
|-------|-------------|-----|-----|----------|------|
| OH | MANSFIELD | 419 | 520 | A | 0661 |
| OH | MANSFIELD | 419 | 520 | 0 | 0661 |
| OH | MANSFIELD | 419 | 520 | 1 | 0661 |
| OH | MANSFIELD | 419 | 520 | 2 | 0661 |
| OH | MANSFIELD | 419 | 520 | 3 | 0661 |
| OH | MANSFIELD | 419 | 520 | 4 | 0661 |
| OH | MANSFIELD | 419 | 520 | 5 | 553A |
| OH | MANSFIELD | 419 | 520 | 6 | 0661 |
| OH | MANSFIELD | 419 | 520 | 8 | 553A |

Therefore, for reporting utilization in this example, the following thousands blocks and pooling indicators are reported:

TABLE VIII

Pooling Reporting Example

| NPA_NXX_X | RATE_CTR | POOL |
|-----------|----------|------|
| 419-520-0 | MANSFIELD | |
| 419-520-1 | MANSFIELD | |
| 419-520-2 | MANSFIELD | |
| 419-520-3 | MANSFIELD | |
| 419-520-4 | MANSFIELD | |
| 419-520-6 | MANSFIELD | |
| 419-520-7 | MANSFIELD | X |
| 419-520-9 | MANSFIELD | X |

Figure 6:
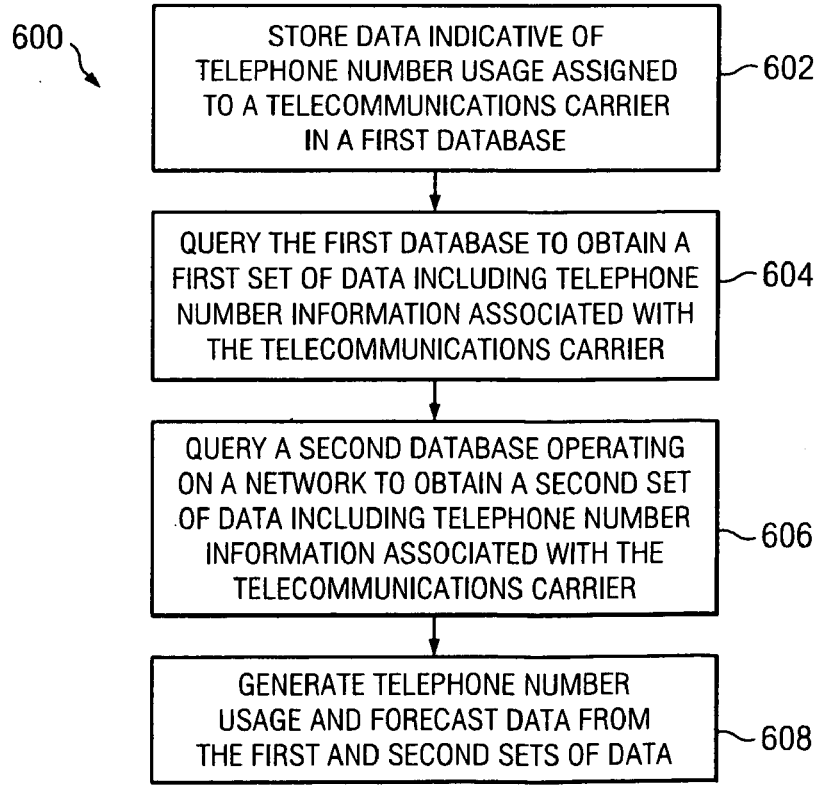
FIG. 6 is a flow diagram of an exemplary process for reporting telecommunications usage and forecasting.

FIG. 6 is a flow diagram of an exemplary process 600 for reporting telecommunications usage and forecasting. At step 602, data indicative of telephone number usage assigned to a telecommunications carrier is stored in a first database. In one embodiment, the first database is a proprietary database managed by the telecommunications carrier. At step 604, the first database may be queried to obtain a first set of data including telephone number information associated with the telecommunications carrier. At step 606, a second database operating on a network may be queried to obtain a second set of data including telephone number information associated with the telecommunications carrier. In one embodiment, the second database may be a database managed for the telecommunications industry, such as the LERG database. At step 608, telephone number usage and forecast data may be generated from the first and second sets of data. The telephone number usage and forecast data may be used for completing NRUF forms. A third database may also be queried to retrieve information that may assist in determining which form of the NRUF forms to apply the telephone number usage and forecast data.

Using the system and methods described above, the time for completing NRUF reports may be reduced from several weeks to less than an hour. In addition, business information that was otherwise too difficult to accumulate during reporting periods are now able to easily be collected and reported for business purposes. Also, forecasting is improved from conventional forecasting, where the principles of the present invention may forecast by using, in one embodiment, the growth over the past 12 months to project the next 12 months rather than simply using a flat number as may previously have considered to be acceptable.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for forecasting and reporting telecommunication usage by a telecommunications carrier, said system comprising:
    a first database operated by the telecommunications carrier and storing data indicative of telephone number usage of telephone numbers assigned to the telecommunications carrier;
    a computing device in communication with a second database via a network, the second database being operated external to the system and storing telephone number usage information associated with multiple telecommunications carriers, said computing device executing software to query said first database operated by the telecommunications carrier and the second database to retrieve information from the database to automatically generate a telephone number usage and forecast data from the information of the databases and to populate fields of a report with the telephone number usage forecast to be submitted to a telecommunications reporting agency for forecasting future telecommunications telephone number usage.

2. The system according to claim 1, wherein the report is a numbering resources utilization and forecast (NRUF) report.

3. The system according to claim 1, wherein the second database is the local exchange routing guide (LERG) database.

4. The system according to claim 1, wherein the telephone number usage and forecast data includes categories associated with the usage.

5. The system according to claim 1, wherein the telephone number usage forecast of the telecommunications carrier includes data indicative of usage of an NPA-NXX-X (thousands block).

6. The system according to claim 1, wherein the software is used to query said database operated by the telecommunications carrier to determine how many numbers of an NPA-NXX-X (thousands block) are being used by customers of the telecommunications carrier.

7. The system according to claim 1, wherein the software is used by the computing device to query said database operated by the telecommunications carrier to determine rate center growth and NPA growth of the telecommunications carrier.

8. The system according to claim 7, wherein the software is used by the computing device to determine a thousands block forecast for each rate center, NXX forecast for each rate center, and NXX forecast for each NPA.

9. The system according to claim 1, wherein the software is used by the computing device to query the second database for thousands blocks assigned to a telecommunications carrier and thousands blocks not assigned to a telecommunications carrier.

10. The system according to claim 9, wherein the software is further used to determine carrier and non-carrier working numbers to determine rate center percent utilization and NPA percent utilization.

11. A method for forecasting and reporting telecommunications usage by a telecommunications carrier, said method comprising:
    storing data indicative of telephone number usage assigned to the telecommunications carrier in a first database managed by the telecommunications carrier;
    querying the first database to obtain a first set of data including telephone number information associated with the telecommunications carrier;
    querying a second database managed by an industry organization and operating on a network to obtain a second set of data including telephone number information associated with the telecommunications carrier; and
    automatically generating telephone number usage and forecast data from the first and second sets of data and to populate fields of a report with the telephone number usage to be submitted to a telecommunications reporting agency for forecasting future telecommunications telephone number usage.

12. The method according to claim 11, wherein populating fields of the report includes populating an NRUF report.

13. The method according to claim 11, wherein querying the second database includes querying a LERG database.

14. The method according to claim 11, wherein generating includes generating categories associated with the usage.

15. The method according to claim 11, wherein generating includes generating data indicative of usage of NPA-NXX-X (thousands block).

16. The method according to claim 11, wherein querying the first database includes determining how many numbers of a NPA-NXX-X (thousands block) are being used by customers of the telecommunications carrier.

17. The method according to claim 11, wherein querying the first database includes determine rate center growth and NPA growth of the telecommunications carriers.

18. The method according to claim 17, further comprising determining a thousands block forecast for each rate center, NXX forecast for each rate center, and NXX forecast for each NPA.

19. The method according to claim 11, wherein querying the second database includes determining unassigned numbers and assigned numbers donated for pooling by the telecommunications carrier.

20. The method according to claim 19, further comprising determining carrier and non-carrier working numbers for the software to be further used to determine rate center percent utilization and NPA percent utilization.

* * * * *